M. B. FERNANDES, Jr.
HARROW.
APPLICATION FILED MAY 23, 1919.
1,348,100.
Patented July 27, 1920.
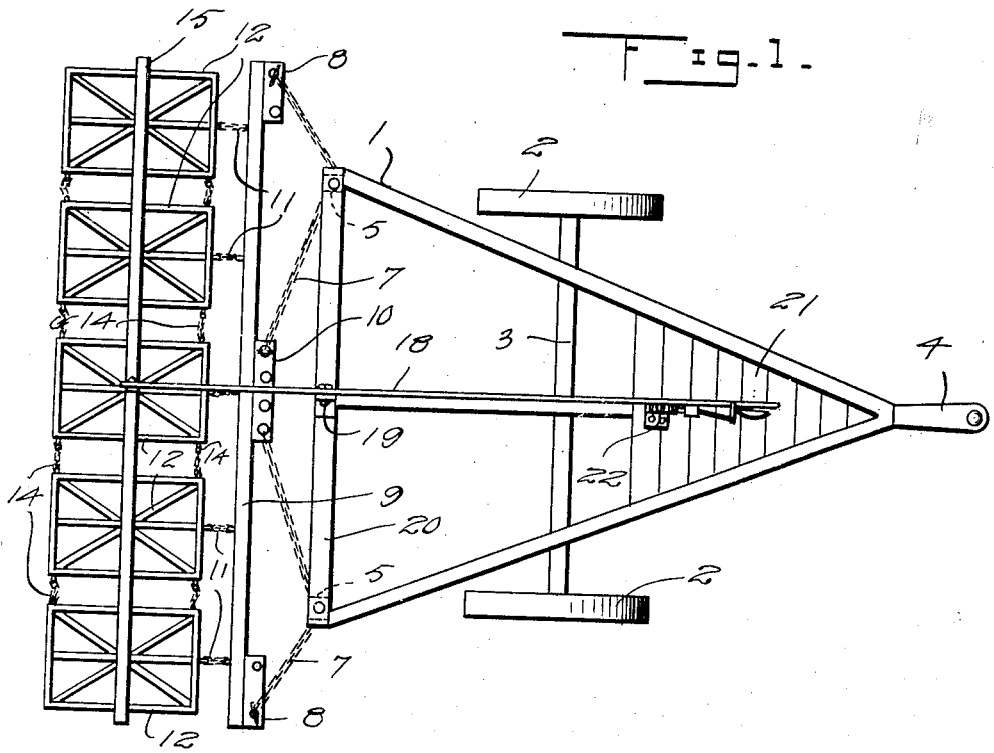
Inventor
M. B. Fernandes, Jr.
By ꭱ. Randolph, Atty.

UNITED STATES PATENT OFFICE.

MANUEL BRAGA FERNANDES, JR., OF LIHUE, TERRITORY OF HAWAII, ASSIGNOR OF ONE-FOURTH TO MANUEL B. FERNANDES, SR., OF LIHUE, TERRITORY OF HAWAII.

HARROW.

1,348,100.   Specification of Letters Patent.   Patented July 27, 1920.

Application filed May 23, 1919. Serial No. 299,098.

*To all whom it may concern:*

Be it known that I, MANUEL B. FERNANDES, Jr., a citizen of the United States, residing at Lihue, Kauai, Territory of Hawaii, have invented certain new and useful Improvements in Harrows; and I do hereby declare the following to be a full, clear, and exact description of the invention, such as will enable others skilled in the art to which it appertains to make and use the same.

This invention relates to harrows, and more particularly to a harrow of the gang type.

One of the main objects of the invention is to provide a harrow of the character stated of simple construction and operation by means of which a plurality of independently movable harrow sections may be readily connected to a traction engine, or other suitable traction means, so as to be drawn thereby across a field to be harrowed. A further object is to provide simple and efficient means for connecting the harrow sections to a portable frame for drawing the same, this means being adapted to permit independent vertical movement of the different sections so as to insure thorough working or harrowing of the soil. A further object is to provide simple and efficient means for simultaneously raising all of the harrow sections into inoperative position while not materially interfering with independent movement of these sections. Further objects will appear from the detailed description.

In the drawings:

Figure 1 is a top plan view of a harrow constructed in accordance with my invention.

Fig. 2 is a side view of the same.

The main frame 1 of the harrow is of forwardly tapering substantially triangular shape and is supported so as to be readily transportable upon ground wheels 2 rotatably mounted upon an axle 3 secured to the under side of the frame as shown. At its forward end or apex, frame 1 is provided with an attaching member or clevis 4 of suitable type by means of which this frame may be readily attached to a tractor so as to be drawn across a field thereby.

The main frame is provided, at each rearward corner thereof, with a depending substantially V-shaped attaching bracket 5 the vertical arm 5ª of which is provided with a plurality of spaced apertures 6. These brackets provide means whereby suitable lengths of chain 7 may be adjustably secured to the rear of frame 1, the outer ends of these lengths of chain being secured to angular attaching plates 8 which are secured to the forward face of a pulling bar 9 adjacent each end thereof. The inner ends of the chain lengths 7 are secured to a central angle plate 10 carried by bar 9, this plate 10 and the plates 8 being provided with longitudinally spaced openings so as to permit adjustment of the attachment of the chain lengths. Pulling bar 9 is connected by relatively short chain lengths 11 to a plurality of substantially rectangular shaped harrow sections 12, at the centers of the forward ends thereof, these harrow sections being of known type and including transversely and longitudinally extending bars provided with depending teeth 13. The harrow sections 12 are connected at their forward and rearward ends by flexible members 14, such as short lengths of chain so as to be normally held in parallel spaced relation. By this arrangement, each harrow section is free to move independently of the other sections so as to conform to the configuration of the surface of the soil, all of the harrow sections being connected so as to form a unit which serves to effectually harrow and pulverize the soil as it is drawn over the same. This unit thus produced is connected through the medium of the pulling bar 9 and the chain lengths 7 to frame 1 so as to be drawn thereby over a field to be harrowed.

A lifting bar 15 extends longitudinally of the harrow unit at the central portion thereof, this lifting bar being connected by flexible connections as indicated at 16 to the respective harrow sections 12 at the center of each section. Lifting bar 15 is connected, at its longitudinal center, by a flexible member such as a suitable length of chain 17 to the rearward end of a lifting lever 18 rockably supported for movement about a horizontal axis by a standard 19 secured to the rear end beam 20 of the frame 1. This lever is of relatively great length and the forward portion thereof extends above a platform 21 provided at the forward end of the frame 1 so as to be readily accessible to an operator standing upon this platform. A vertical standard or rack bar 22 extends upwardly from platform 21 adjacent one side of lever 18 so that, by forcing this lever into engagement with the rack bar it may be readily secured thereby in rocked adjustment. The flexible connections between the lifting bar and the harrow sections prevent interference by this bar with the free and independent movement of the sections thus insuring that the harrow will act to best advantage. These connections also provide means whereby an operator standing upon the platform 21 may readily raise or lower the harrow to any desired degree as conditions may require, or may raise the harrow completely out of contact with the ground surface into inoperative position, the harrow being held in this position by the rack bar and the lever.

What I claim is:

1. In a harrow, a portable frame, a pulling bar flexibly secured to said frame at the rearward end thereof, and a plurality of flexibly connected harrow sections flexibly secured at their forward ends to said pulling bar so as to be drawn thereby during forward travel of the frame.

2. In a harrow, a portable frame, a transversely extending pulling bar flexibly secured to said frame at the rearward end thereof, a plurality of harrow sections flexibly secured at their forward ends to said pulling bar so as to have independent vertical movement, a lifting bar flexibly secured to said harrow sections so as to permit independent movement thereof, and means for raising said lifting bar so as to lift the harrow sections into inoperative position.

3. In a harrow, a portable frame, a transversely extending pulling bar flexibly secured to said frame at the rearward end thereof, a plurality of harrow sections flexibly secured at their forward ends to said pulling bar so as to have independent vertical movement, a lifting bar flexibly secured to said harrow sections so as to permit independent movement thereof, and means for raising said lifting bar so as to lift the harrow sections into inoperative position, said means being flexibly connected to the lifting bar so as to permit independent movement thereof when the harrow sections are lowered into operative position.

In testimony whereof I affix my signature in presence of two witnesses.

MANUEL BRAGA FERNANDES, Jr.

Witnesses:
 JOHN B. FERNANDES,
 MASARU SHINSEKI.